May 27, 1958 B. T. SALMON 2,836,379
RAMJET WING SYSTEM FOR JET PROPELLED AIRCRAFT
Filed May 18, 1954 3 Sheets-Sheet 2
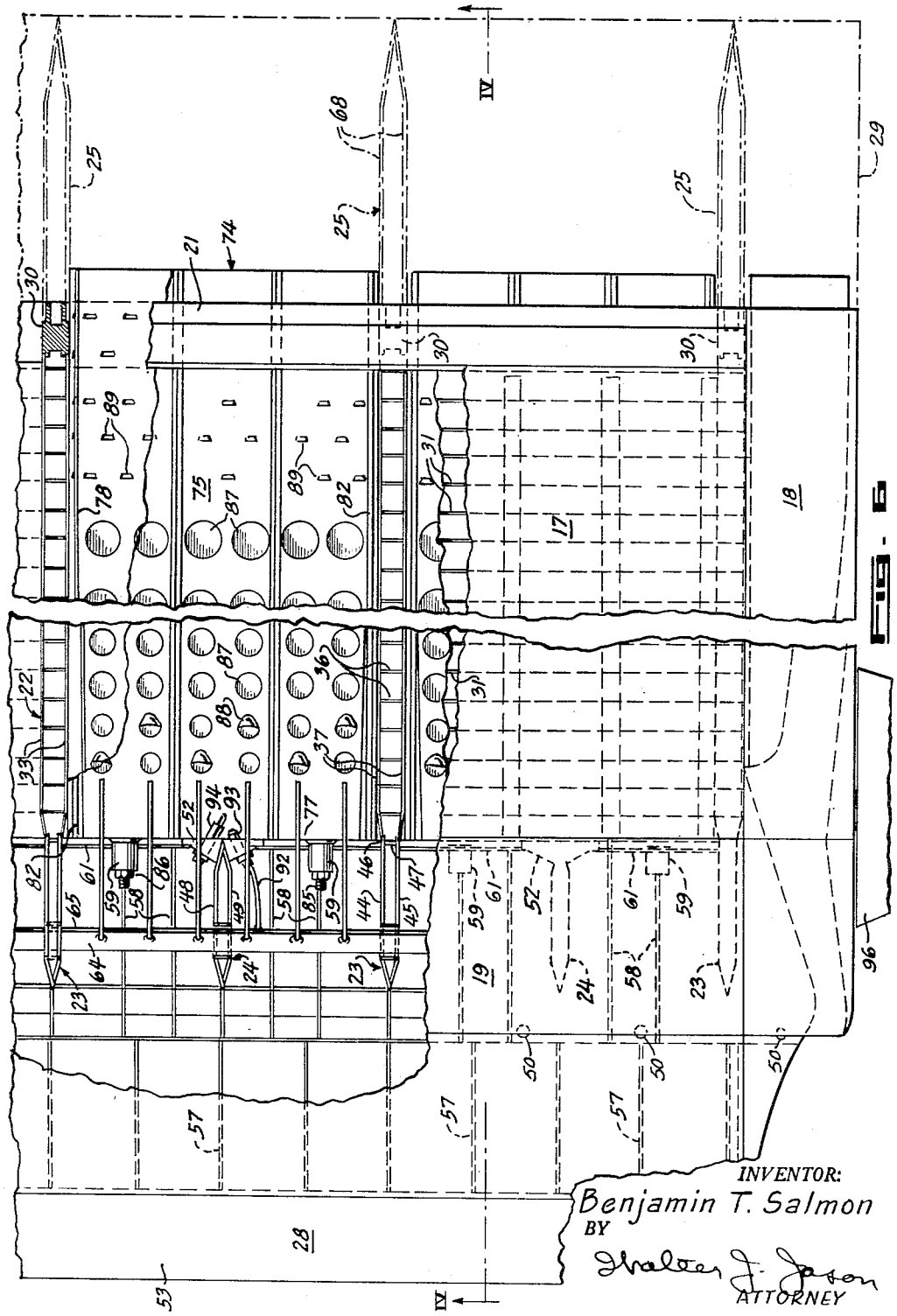
INVENTOR:
Benjamin T. Salmon
BY
ATTORNEY

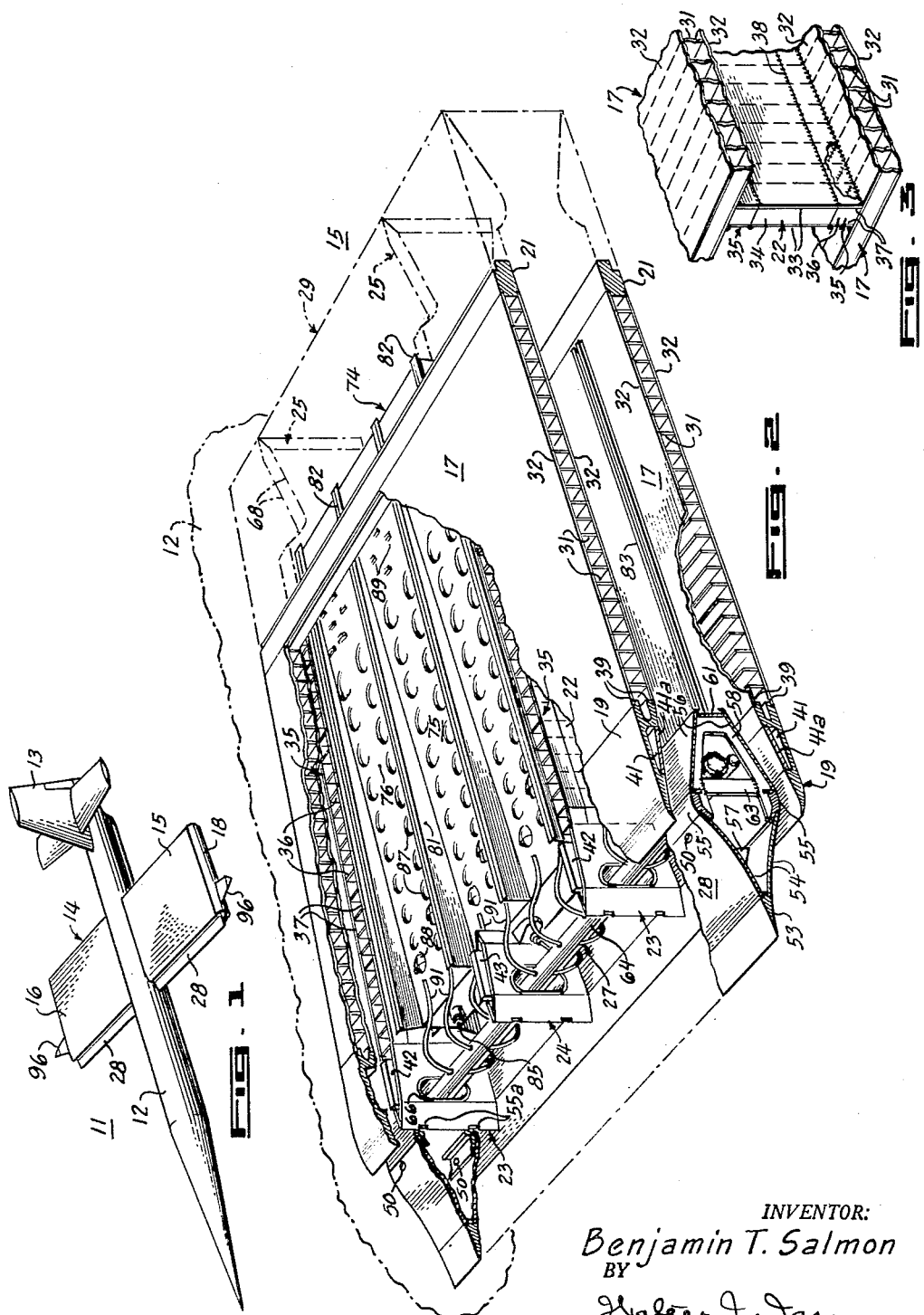

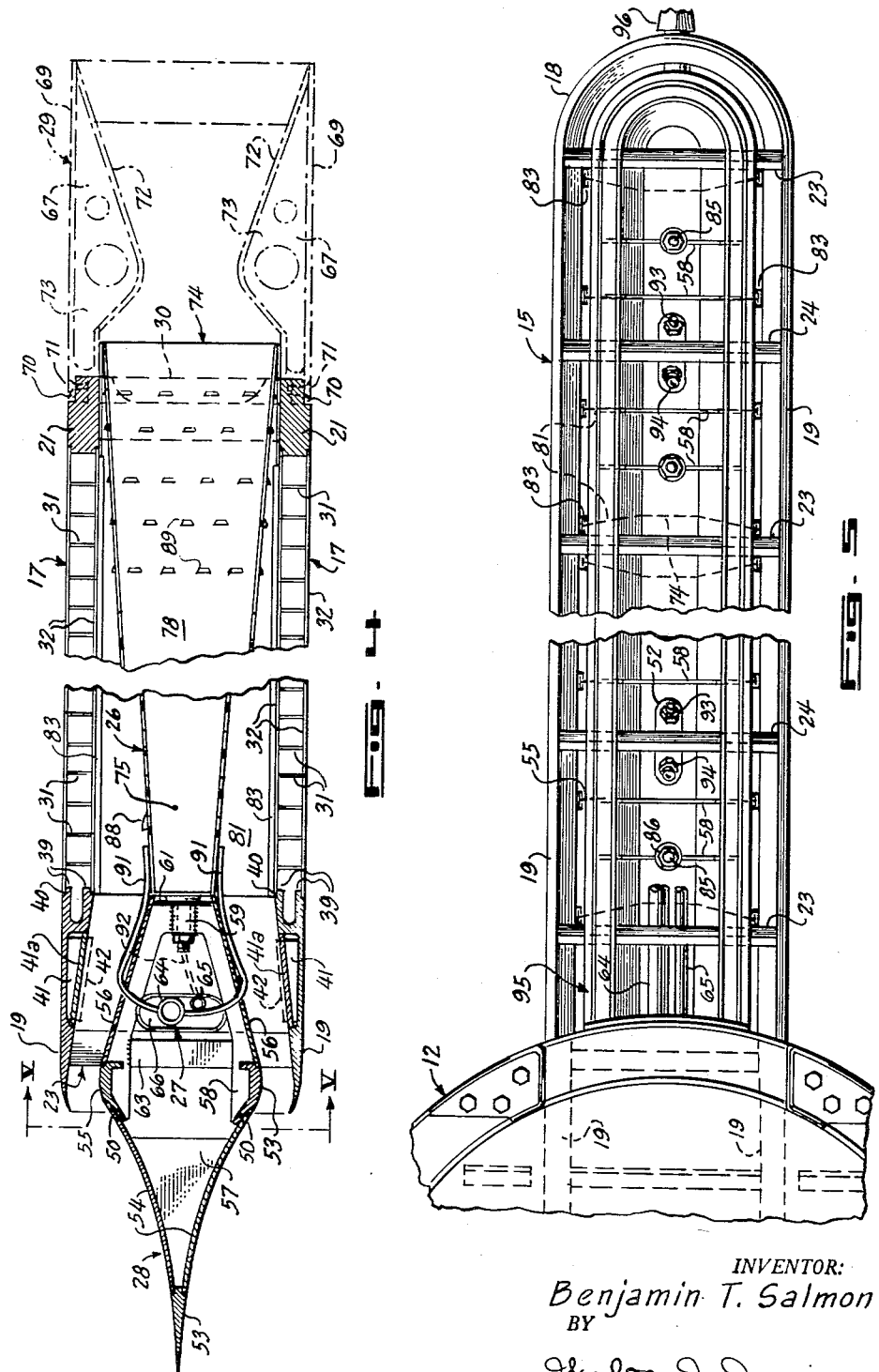

United States Patent Office 2,836,379
Patented May 27, 1958

2,836,379
RAMJET WING SYSTEM FOR JET PROPELLED AIRCRAFT

Benjamin T. Salmon, San Diego, Calif., assignor to General Dynamics Corporation, San Diego, Calif., a corporation of Delaware Application May 18, 1954, Serial No. 430,521

3 Claims. (Cl. 244—15)

This invention relates to aircraft and more particularly to aircraft which are adapted for propulsion at supersonic velocities by ramjet engines.

Present day performance requirements for supersonic aircraft, including guided missiles, make desirable the development of a high-speed, self-propelled airborne vehicle characterized by extremely low aerodynamic drag and a high lift curve slope. As is known, an infinitely thin flat plate is the lowest possible drag airfoil since its drag is only the skin friction drag of the two surfaces. If it is assumed that such a plate is split in half and the surfaces moved apart a distance sufficient to provide space for a combustion system for propulsion, it will be apparent that a structure is provided whose external drag is unchanged as compared with the infinitely thin plate, such external drag consisting only of the viscous or wetted surface drag plus whatever induced drag is present as a function of the angle of attack. The present invention provides a vehicle which is powered by what is in effect such a split plate structure, since the structure is essentially a combustion system sandwiched between a pair of spaced apart flat surfaces or plates.

To produce thrust for propulsion of such a split plate structure, a momentum increase in the airflow is required and it thus becomes necessary to accelerate the air mass flow passing between the two flat plate surfaces. It is well known that this can be done most conveniently by the addition of heat derived from combustion of a suitable fuel injected into the air mass flow or air stream passing between the plates.

Since combustion can most effectively take place in air at low velocity and high pressure, a system is required to convert the high velocity, low pressure air encountered in the operation of ramjet engines to the desired low velocity, high pressure state. As will be described, an isentropic Oswatitsch type of supersonic diffuser is preferably utilized in the present invention to achieve this conversion.

To obtain suitable and efficient combustion, a burner system is required which is adapted for maintaining continuity of combustion, the system desirably including a high intensity pilot flame together with means for intimately mixing the fuel and air. Further, the burner system should be compact in size and capable of effecting high combustion efficiencies while utilizing the least possible length of air stream through a wide range of pressures at fairly high internal subsonic air velocities and at various air fuel ratios ranging from stoichiometric to very lean mixtures. A unique "can" combustor with fuel injection upstream of the can is utilized in the present invention to attain these desired characteristics.

From the statements thus far made it is apparent that the greatest aerodynamic drag of the vehicle or missile will result by virtue of the system provided for burning the fuel in the internal airstream. Since this drag is not logically an aerodynamic drag but is rather a drag chargeable to the combustion process, it is evident that a dimensionally thick structure is provided which is aerodynamically thin, since it possesses substantially only the true aerodynamic drag of the infinitely thin plate above described together with certain additional drag which is caused by the shape into which the leading edges or lips of the spaced plates must be formed in order to derive optimum efficiency from the supersonic diffuser.

The split plate structure of the present invention preferably forms both sustaining and propulsion means for an aircraft or missile, although it will be apparent that the structure may also be separately attached to a conventional aircraft such as at the wingtip, for example, to thereby provide propulsion means which are separate from the conventional wings or other sustaining structure. Thus, in the preferred embodiment of the present invention, one of the basic and unique features is the splitting of a wing along the chordplane into two components, which components are separated by ducts and combustion chambers in which high temperatures and pressures are developed. As is evident, such a split wing structure presents unique problems relating to the interconnection of the split parts of the wing whereby the structure can effectively resist the internal pressures and transfer the air or aerodynamic loads to the aircraft body or fuselage. In addition, such interconnection should be such as to provide minimum bending deformation, minimum torsional rotation, minimum obstruction to internal airflow, and good wall smoothness in the air or duct passages.

Accordingly, it is a principal object of the present invention to provide an improved, self-propelled vehicle capable of traveling at supersonic speeds.

Another object of the present invention is the provision of an improved airborne vehicle driven by a ramjet engine and characterized by low aerodynamic drag and a high lift curve slope.

A further object of the invention lies in providing a unique ramjet propelled aircraft embodying an improved form of supersonic diffuser.

Another object of the invention is the provision of an improved form of aircraft in which there are provided ramjet propulsion means so constructed and integrated with the aircraft as to constitute a power plant which is compact in size and efficient in operation at its design speeds and altitudes.

An additional object of the invention is to provide for an aircraft a ramjet propulsion means of a configuration which not only serves to propel but also serves to sustain the aircraft in flight.

Another object of the invention is the provision of a ramjet driven airborne vehicle which is characterized in part by a burner system and structure adapted for effecting efficient and continuous combustion for extended periods without significant localized deformation through overheating.

A further object of the invention is to provide an improved ramjet propelled airborne vehicle which is characterized by a construction and operation which contribute to improved fuel economy, extended range of operation, low vehicle weight, high capacity for payload, and minimum size of launching booster if such is required.

A still further object of the invention lies in the provision of a ramjet propelled airborne vehicle which is simple and inexpensive to manufacture and thus adapted for use as an expendable missile.

Other objects and features of the present invention will be readily apparent to those skilled in the art from the following specification and appended drawings wherein is illustrated a preferred form of the invention, and in which:

Figure 1 is a perspective view of a guided missile embodying ramjet propulsion means in accordance with the present invention;

Figure 2 is a perspective detail view of a portion of the port wing panel of the guided missile, portions being omitted for clarity;

Figure 3 is a perspective detail view illustrating a typical connection between upper and lower wing surface panels and a chordwise rib panel of the wing;

Figure 4 is a chordwise sectional view of the port wing panel taken along line IV—IV of Figure 6;

Figure 5 is a front elevational view of the port wing panel, taken along line V—V of Figure 4, the forward portion of the diffuser being removed for clarity; and Figure 6 is a plan view of the port wing panel, portions being cut away for clarity.

Referring to the drawings and more particularly to Figures 1 and 2, there is illustrated an embodiment of the invention which is adapted for use as a pilotless aircraft or guided missile, although it will be apparent that the wing of the missile may also easily be adapted for other uses, such as for use as an external ramjet propulsion means for a conventional piloted aircraft by suitable attachment thereto. For convenience of description the particular embodiment illustrated herein is sometimes referred to as a split wing ramjet, this name being appropriate by virtue of the double function of the wing as a sustaining and a propelling unit.

The aircraft or missile, designated in its entirety by the numeral 11, comprises generally a fuselage 12, empennage 13, and a wing 14 which latter constitutes the primary airfoil or sustaining means for the aircraft. Wing 14, which also constitutes the ramjet propulsion means for the aircraft 11, includes a port wing body, housing, or panel 15 and a starboard wing body, housing or panel 16. Since wing panels 15 and 16 are identical in the elements included in their construction, the detailed description hereinafter made will be primarily directed to port wing panel 15.

Wing panel 15, as shown, comprises, generally, a pair of identical, substantially uniformly spaced apart outer members or wing surface panels 17 which are connected at their outboard ends by a wing tip 18 whose streamline shape, as illustrated, tends to reduce the aerodynamic drag of wing panel 15.

Forming a forward portion or extension of each of the upper and lower wing surface panels 17 is a spar cap or diffuser lip 19, and forming a rearward extension of each wing surface panel 17 is a spar cap 21. Spar caps 19 and 21 provide the principal spanwise strength for wing 14, each of the forward pair of spar caps 19 being rigidly secured to the forward edges of its associated surface panel 17, and each of the pair of rearward spar caps 21 being rigidly secured to the rearward edges of its associated surface panel 17. It is here noted that the pairs of spar caps 19 and 21 are not only continuous along the forward and rearward portions, respectively, of wing 14, but also desirably run through, and are suitably affixed to, fuselage 12 to thereby provide spanwise strength and rigidity for wing 14. All other portions of wing 14 terminate or are discontinuous at the side of fuselage 12. The means and method which may be utilized to affix or secure wing 14 to fuselage 12 are not important to the present invention, any conventional means for rigidly maintaining wing 14 in position being satisfactory.

Wing surface panels 17, as best shown in Figures 2 and 6, are securely maintained in spaced apart parallel relationship by a plurality of main ribs or rib panels 22 which are substantially uniformly spaced in a spanwise direction, and extend in a chordwise direction between the pair of surface panels 17 to thereby provide additional chordwise strength for wing panel 15, and also to form, with wing surface panels 17, an open ended enclosure means. Similarly, the pair of front spar caps 19 are spaced apart and supported by a plurality of main verticals 23 and a plurality of intermediate verticals 24, main verticals 23 each being secured to the forward end of one of rib panels 22, and forming a forward extension thereof, while intermediate verticals 24 are each located approximately midway between a pair of main verticals 23 and serve as an auxiliary spacing and support means for spar caps 19. Spacing and support means for rear spar caps 21 are provided by a plurality of rearward verticals 30 which, like main verticals 23, are also uniformly spaced in a spanwise direction, and are rigidly connected, as by welding, to the rearward ends of panels 22 and, at their upper and lower ends, to spar caps 21 to thereby form, with a corresponding number of nozzle verticals 25, rearward extensions of panels 22. It is noted that there are no intermediate nozzle verticals corresponding to the described intermediate verticals 24, this being so for the reason that the strength characteristics of wing panel 15 have been found to be sufficiently good that the omission of intermediate verticals is permissible and desirable since it will reduce internal flow restriction.

A burner, combustor or can 26 is located between surface panels 17, as best shown in Figures 2 and 4, and is preferably sectionalized, as will be more particularly described hereinafter, to fit between each pair of adjacent ribs 22 in the space or bay defined therebetween. Dividing can 26 into a plurality of burner or can sections as above mentioned is done merely in order to simplify and facilitate assembly of wing 14 during the construction or servicing thereof.

Can 26 serves as a flame holder and provides a means for effecting combustion of the air-fuel mixture which will be fed thereinto, and is serviced by a conventional fuel supply and injection system which is illustrated in sufficient detail for understanding thereof and is designated generally by the numeral 27. Located forward or upstream of can 26 is an inlet wedge or diffuser 28 which serves to effect supersonic isentropic external compression and subsequent subsonic internal expansion of ram air entering can 26, and located at the rearward end of can 26 is a nozzle section 29 of preferably convergent-divergent configuration (Figure 4) which is removably secured to rear spar caps 21 to thereby define an exit for combustion gases escaping or spouting from can 26.

Diffuser 28 terminates at fuselage 12 and is disposed and supported between the pair of front spar caps 19 by main verticals 23 and intermediate verticals 24, diffuser 28 thereby providing an additional or auxiliary beam or spar for spanwise strength and reduced deflection of wing panel 15. Similarly, nozzle section 29, by virtue of its spanwise disposition coextensive with rear spar caps 21, provides further spanwise strength for wing panel 15.

Hereinabove, a description has been afforded of the main elements of the inventions and their interrelationship and now a more detailed individual description of these various portions and components of the present invention and their purposes will be made.

The primary structural function of wing surface or skin panels 17 is to transport the operating ram pressure or bursting pressure developed within wing panel 15 to the plurality of rib panels 22 where it is canceled or equalized by the load bearing capacity of surface panels 22. Also, wing surface panels 17 transmit the aerodynamic lift through rib panels 22 to spar caps 19 and 21 and thence to fuselage 12 of the aircraft, and further surface panels 17 tend to equalize deflections of spars 19 and 21. In these circumstances it has been found that the construction of each wing surface panel 17 and rib panel 22 in the present invention provides high strength and is advantageous in that the described structural functions are effected with a low degree of dimensional change in wing panel 15 which has been found to be important since tests have indicated the efficiency of diffuser 28 is sensitive to any pronounced or appreciable degree of dimensional change in panel 15.

Each wing surface panel 17 possesses a comparatively high strength-weight ratio by virtue of its unique composite construction. This construction is effected, as best illustrated in Figures 2 and 3, by the welded securement of a plurality of vertical elements 31 between a pair of skins or sheets 32, which form the outside and inside surfaces of each wing surface panel 17. Elements 31 are uniformly spaced chordwise along sheets 32, and are continuous in a spanwise direction. This composite construction is identical in each of the pair of upper and lower wing surface panels 17.

The construction of rib panels 22, which space apart wing surface panels 17, is substantially identical to that of wing surface panels 17, each rib panel 22 including a pair of vertically disposed rib skins 33 which extend in a chordwise direction and are securely maintained in spaced apart relation by a plurality of elements 34 disposed normal to rib skins 33 and preferably welded thereto.

Each rib panel 22 is connected at its upper and lower edges to a chord-wise extending stub rib 35 which in turn is welded to wing surface panel 17. Each stub rib 35 includes a plurality of stub elements 36, similar to elements 34 of rib 22, which are welded normal to and between a pair of spaced stub skins 37, similar to skins 33 of rib 22, whereby upon assembly the components of each stub rib 35 become in effect extensions of the components or rib panel 22, facilitating assembly of wing surface panels 17 and rib panels 22 by virtue of the comparatively easy accessibility for welding of the butted joints, as at 38. Thus, there is provided an integral wing surface panel 17 of composite construction which is characterized by high strength and good dimensional rigidity. It is to be noted, however, that wing surface panels 17 are preferably discontinuous through fuselage 12, the principal spanwise strength of wing 14 being provided by spar caps 19 and 21, as previously stated.

Front spar caps 19 together with intermediate verticals 24 and main verticals 23 act generally as a spar structure which is similar to the well known Vierendiel truss, spar diagonals being preferably omitted from the spar structure for various reasons including the more desirable ram air flow properties thereby achieved. Each of the front spar caps 19 of this spar structure comprises a formed member embodying, as best shown in Figure 4, rearwardly extending upper and lower flanges 39 which are each provided with a spanwise extending step 40 to which sheets 32 of wing surface panels 17 are welded. In addition, front spar caps 19 are provided with a lightening channel 41 extending in a spanwise direction and which is closed by a plurality of spar plates 41a welded in position as illustrated. Each of the pair of spar caps 19 is curved inwardly at the forward edge thereof so as to provide a curved lip portion which in combination with the forward portion of diffuser 28 serves to achieve improved efficiency in converting the velocity energy of high speed ram air entering wing panel 15 to pressure energy for improved combustion.

As previously mentioned, main verticals 23 and intermediate verticals 24 space apart front spar caps 19, the upper and lower ends of main verticals 23 each being rigidly secured to a separate connecting tab 42. One tab 42 is welded between the upper edges of main vertical 23 and the base of the formed lightening channel 41 in the middle portion of one of spar caps 19, while the other tab 42 is welded between the lower edges of vertical 23 and this formed lightening channel 41. It is noted that spar plates 41a are welded at their ends to tabs 42 to further strengthen the connection of main verticals 23 to spar caps 19. In a similar manner intermediate verticals 24 are rigidly connected, preferably by welding, to spar caps 19 by a pair of tabs 43 which are welded to spar plates 41a in a manner like that just described in connection with verticals 23.

Each main vertical 23, as best illustrated in Figure 6, is constructed of a vertical plate 44 and a vertical plate 45 whose forward edges are shaped to a point and weldably joined, and whose rearward edges are channeled, as at 46, to weldably receive rib skins 33. In addition, a spacer 47 is weldably disposed between rib plate 44 and rib plate 45 to maintain and strengthen the spaced relation thereof. Similarly, intermediate verticals 24 each comprise a pair of vertically disposed intermediate plates 48 and 49 whose forward and rearward edges are shaped to define substantially knife-like edges, the rearward edge being notched at 51, Figures 2 and 6, for receiving in welded connection an igniter fitting 52. In this manner, the combination of spar caps 19, main verticals 23, and intermediate verticals 24 provide a lightweight composite structure of comparatively high strength which is adapted for effectively resisting the combined forces of internal pressure and external aerodynamic pressure in a manner structurally similar to the conventional Vierendiel truss.

As described previously, diffuser 28 serves as an auxiliary beam for the Vierendiel truss structure just described, and also serves to effect isentropic compression of entering ram air and suppression of shock waves or pressure and velocity discontinuities to thereby utilize a maximum proportion of the kinetic energy of the entering ram air, as is well known in the art. Diffuser 28 preferably possesses a cross section similar to the cross section of the Oswatitsch type diffuser, which type of diffuser is described in "Elements of Aerodynamics of Supersonic Flows," by Antonio Ferri (The MacMillan Company, 1949), at pages 193–195. The type of diffuser used in the present invention is a version of the Oswatitsch multiple oblique shock type, utilizing a continuously curved concave control body profile, instead of a multiple wedge, for external diffusion. The diffuser is designed to produce two dimensional supersonic external isentropic compression of the air flow along the continuous concave central body with an accompanying reduction in Mach number to some value above 1.0 at the diffuser lip. A normal shock occurs at the lip and the air is expanded subsonically to the desired value to permit satisfactory combustion. In order to obtain maximum mass flow at the designed Mach number the shock wave from the forward edge of the diffuser 28 and the compression waves from the exterior surfaces of the diffuser are all focused at the diffuser lip 19. No internal supersonic compression has been allowed in the present invention although, if desired, such may be provided for. In addition, a half-Oswatitsch type diffuser may be employed as a variation, if desired, of the full-Oswatitsch type herein preferred and described.

It is particularly noted that the present diffuser is mainly two dimensional in configuration, flow occurring over and under the central diffuser body, or simply over in the case of a half-Oswatitsch type diffuser body, as contrasted with three dimensional flow in which flow occurs, for example, about a body of revolution which presents a circular cross section to the fluid flow.

As illustrated, diffuser 28 is characterized by a spanwise extending knife edge wedge portion, or forward portion 53 which flares or diverges smoothly rearwardly to join other structure of diffuser 28 in the region of maximum cross section thereof, diffuser 28 thence reducing in cross section to a junction with can 26. At its rearward portion knife edge 53 is stepped, as best shown in Figure 4, for weldably accepting the forward edges of a pair of smooth surfaced forward diffuser sheets 54, as illustrated, the shape of sheets 54 serving to define the configuration of diffuser 28 from the forward knife edge 53 to approximately the region of maximum cross section of diffuser 28. Each of these forward diffuser sheets 54 is preferably removably secured at its rearward edge by any suitable fastening means such as by machine screws 50 or the like, within a step provided in a respective one of a pair of vertically spaced apart and spanwise extending lip spars 55. The removable connection of sheets 54 to lip spars 55 permits easy disconnection thereof for inspection or servicing of fuel supply and injection system 27 and its usual associated ignition wiring. Spars 55 are also provided, as shown in Figure 4, with steps at their rearward edges for weldably receiving a plurality of smooth surfaced rearward diffuser sheets 56 which serve to define the configuration of the rearward portion of diffuser 28. These sheets 56 are disposed in opposed pairs between and welded to each main vertical 23 and its adjoining intermediate vertical 24, or in the inboard region of wing section 15 to fuselage 12. Further rigidifying the integration of diffuser 28 with other structure of wing panel 15 is the welded attachment of lip spars 55 within suitable notches 55a provided in the forward edges of main verticals 23 and intermediate verticals 24. In addition, the outer surfaces of diffuser 28 are preferably made smooth in order to achieve good aerodynamic efficiency.

Diffuser 28 is internally braced or strengthened by a series of members which are vertically disposed and extend in a chordwise direction, these members including a plurality of wedge ribs 57 which are uniformly spaced in a spanwise direction within the space between the pair of forward diffuser sheets 54, and suitably welded thereto. Strengthening of the rearward portion of diffuser 28 is provided by a plurality of after wedge ribs 58 which are spaced, as best illustrated in Figure 6, in a spanwise direction, two of ribs 58 preferably being disposed between each main vertical 23 and its adjoining intermediate vertical 23. Each after wedge rib 58, Figure 4, is rigidly secured, as by welding, to the undersurfaces of lip spars 55 and rearward diffuser sheets 56. In addition, every other rib 58 is notched or cut away at its rearward end portion to weldably receive a guide bushing 59 for aligning and securing can 26 on assembly of wing 14. As illustrated, the remaining after wedge ribs 58 are not notched or cut away, but are instead continuous from one rearward diffuser sheet 56 to the opposed sheet 56. In addition, in order to close the rearward open end of diffuser 28 and for added strength a vertically disposed rearward bulkhead 61 is welded to and extends in a spanwise direction between each main vertical 23 and the adjacent igniter fitting 52, each bulkhead 61 being provided with appropriate cut outs or openings for accommodation of guide bushings 59 and igniter fitting 52. Bulkheads 61 are also welded to contiguous portions of wedge ribs 58. Further internal bracing for diffuser 28 is provided by a series of intermediate frames 63 which are vertically disposed and uniformly spaced spanwise between opposing after wedge ribs 58, being welded to ribs 58 to provide increased strength for resisting aerodynamic loads exerted upon diffuser 28 by ram air entering wing panel 15.

The interior of diffuser 28 is hollow for light weight and to enable certain components of the present invention, including fuel supply and injection system 27, to be substantially completely housed therewithin for the purpose of reducing aerodynamic drag by presenting a clean, streamline path for entering ram air. Thus, for example, a main fuel line 64 and a pilot fuel line 65 of fuel system 27 are disposed within diffuser 28 through a plurality of aligned oblong openings 66, one such opening being provided in each main vertical 23 and in each intermediate vertical 24, and lines 64 and 65 being suitably secured against movement, as by brackets, clamping means, or the like.

Discharge nozzle or nozzle section 29 is of the convergent-divergent type and serves as a sonic and supersonic propulsive nozzle for the ejection of heated air and combustion gases generated by the combustion process, whereby there is derived the thrust for propulsion of missile 11, as is well known to those skilled in the art. Nozzle section 29 has a fixed area exit or throat in the present invention, but it is evident that nozzle section 59 may be provided with a variable area exit or throat if desired for increased efficiency. As a matter of fact the increased efficiency which may be achieved by utilizing a variable area exit type nozzle may well justify its use in many cases where the increased complexity thereby produced is not objectionable. Although some form of nozzle section is a necessary part of the combination making up port wing panel 15, the particular form of nozzle section 29 illustrated in the drawings does not form an essential part of the present invention but instead is merely one form of nozzle section 29 which has been found to give suitable results.

Nozzle section 29 herein utilized comprises a plurality of nozzle verticals 25 which are welded at top and bottom in spaced, spanwise relation, between the inner surfaces of a pair of nozzle fairings 67, as best illustrated in Figures 2 and 4. The pair of nozzle fairings 67 serve to define a restricted exit or throat for the sonic or supersonic expulsion of combustion and other gases leaving can 26. Nozzle section 29 is generally of light weight composite construction, the various components being welded together to form an integral unit. Thus nozzle verticals 25 each comprise a pair of nozzle plates 68 which are spaced apart at their forward edges, closed at their rearward edges to form a rearward knife edge, and shaped at their upper and lower edges to conform with the inner surface of fairing 67. In addition, the forward edges of nozzle plates 68 are adapted to removably mate with corresponding vertical channels provided in rearward verticals 30, as illustrated best in Figure 6. Each nozzle fairing 67 is also composite in construction, comprising an outer plate 69 and an inner plate 72 which are formed, as illustrated, to define the nozzle throat or exit of the nozzle section 29.

The forward portion of each of the pair of outer plates 69 is formed to provide a forwardly extending ledge 70 which is removably secured, by suitable fastening means, such as machine screws 71, within a complementary channel provided in the rearward portion of a respective rear spar cap 21; with this arrangement nozzle section 29 may be removed to obtain access to the interior of wing panel 15. In addition, the forward portion of each outer plate 69 is provided with rearwardly directed portion which is welded to the forward portion of a respective inner plate 72. The rearward edges of plates 69 and 72 are welded together to form a pair of spaced knife edges extending in a spanwise direction. Further, a plurality of substantially uniformly spaced fairing ribs 73 are provided to rigidify nozzle fairings 67, fairing ribs 73 embodying openings, as illustrated, for desirable weight reduction.

In assembling nozzle section 29 to the other structure of wing panel 15 it is desirable, as above stated, to employ readily removable fastening means, such as screws 71, to permit easy detachment of nozzle section 29 in order to provide ready access to the interior of wing panel 15 for various reasons, such as to enable the insertion or removal of one or more sections of can 26.

As previously described, can 26 is sectionalized and comprises a plurality of sections 74, there being a section for each bay of port wing panel 15. Thus, in the bay formed between the pair of main verticals 23 illustrated in Figure 2, there is provided a typical can section 74, it being understood that additional can sections are utilized in the other bays of wing panel 15 but are omitted in Figure 2 for clarity of illustration. Can section 74 is mainly two-dimensional in function, much like diffuser 28, and extends rearwardly from the downstream portion of diffuser 28 to slightly beyond the forward or upstream portion of nozzle section 29, and, as is best apparent from Figure 4, can section 74, diffuser 28 and nozzle section 29 are positioned with their longitudinal axes in alignment.

Can section 74 is provided with a combustion chamber 75, which is defined by a pair of vertically spaced burner plates 76 which form the top and bottom walls of the chamber and which are interconnected by an integral forward burner wall 77. The side chamber walls are afforded by a pair of burner side wall plates 78 which are welded to the lateral edges of plates 76 and serve to space apart and support plates 76. Side wall plates 78 and rib panels 22 are preferably provided with an opening or plurality of openings (not shown) to effect communication between the various bays or sections of wing panel 15 whereby substantially uniform combustion pressures will be achieved throughout these bays. The location of such holes is not critical and need only be such as to permit the function described.

It is apparent from the drawings that the configuration and association of burner plates 76, forward wall 77 and side wall plates 78 are such as to form a box-like burner or combustor structure which in external appearance, as best illustrated in Figure 4, flares or diverges rearwardly and is open at its rearward or downstream end. This box-like burner structure which includes the combustion chamber or fuel-air mixture zone 75, is supported between wing surface panels 17 by a plurality of runners or support or hanger members 81, which are equally spaced spanwise over the surfaces of plates 76, each hanger member 81 extending from a maximum height in the area of forward burner wall 77 to a minimum height at the downstream end of can section 74. As illustrated, each hanger member 81 includes at its outward edges a flange 82 which is adapted for sliding engagement with a corresponding hanger track, as at 83 in Figure 2, the can section 74 for that bay having been omitted to more clearly illustrate the position and shape of track 83. Thus, with nozzle section 29 detached from the wing surface panels 17, can section 74 may be slidably inserted between wing surface panels 17, each flange 82 slidably cooperating with its respective track 83. When inserted into position, can section 74 extends in a spanwise direction between adjacent rib panels 22 and is positioned slightly spaced therefrom to afford passage for cooling air exteriorly of the side walls 78 of the combustion chamber 75. Further, the runners or hanger member 81 will in cooperation with the interior surfaces of the upper and lower wing surface panels 17 define a plurality of passages or ducts for flowing the stream of incoming ram air above and below the top and bottom walls 76 of combustion chamber 75. It is noted that the air passages or ducts defined between burner plates 76, which form the top and bottom walls of combustion chamber 75, and the interior of wing surface panels 17 rearwardly converge to a minimum section at the rear of can section 74, and likewise the passages or ducts defined at each side of can section 74 by side wall plates 78 of can section 74 and by adjacent rib panels 22 are rearwardly converging. The converging ducts or passages thus formed are designed to accommodate streams of air for cooling all sides of can section 74 during the operation of aircraft 11.

Can section 74 is rigidly secured in position by a pair of studs 85 which are integral with forward burner wall 77 and are disposed through guide bushings 59 of diffuser 28, a pair of suitable lock nuts 86 being provided to complete this connection. In addition, an opening is provided in burner wall 77 so that upon connection of can section 74 to bulkhead 61, the rearward portion of igniter fitting 52 is open to the interior or combustion chamber 75 of can section 74 whereby fuel and ignition means may be provided for the pilot flame, as will be seen.

Burner plates 76 of combustion chamber 75 are provided with a plurality of perforations or holes 87, which, as illustrated, are progressively larger toward the rearward end of the plates 76; further, various of the holes 87 at the upstream end are, as shown, provided with a scoop 88 formed by outwardly dishing the surfaces of plates 76. At the downstream end there are provided a plurality of openings or louvers 89 which by virtue of their shape serve to bring cooling air internally at the rearward or shroud portions of can section 74. These louvers are located at the upper and lower wall plates 76 of can section 74, and also if desired may be provided at the side walls 78 for additional cooling. Thus, a stream of air flowing over the surfaces of plates 76 will be initially diverted in part by scoops 88 into combustion chamber 75 and the remainder of the air will then proceed downstream and a substantial amount will pass through holes 87 and louvers 89. As will be seen, this flow of air serves not only to provide air for combustion purposes but also serves to provide a cooling film or layer of air over the inner surfaces of burner plates 76 to reduce the temperature thereof.

Fuel supply and injection system 27 serves to provide the fuel for combustion, and includes a plurality of rearwardly extending fuel nozzles or fuel injection tubes 91 located in abutment with the outward surfaces of plates 76 and rearward diffuser sheets 56. Fuel tubes 91 are disposed through suitable openings provided therefor in sheets 56, and each connects through a usual restrictive orifice section (not shown) to main fuel line 64. In addition, a pilot fuel tube 92 from pilot fuel line 65 is connected to a suitable fuel nozzle 93 which is threadably secured within nozzle fitting 52. Main fuel line 64 and pilot fuel line 65 are connected to any suitable fuel supply means, such as a pump or pressurized tank (not shown) located within fuselage 12. It is to be understood that any usual and conventional fuel supply system may be utilized in connection with the present invention, it being important only that an adequate supply of fuel at the proper pressure be available for combustion within chamber 75 of can section 74.

Nozzle 93 serves to supply only a small or pilot amount of fuel for the maintenance of a pilot or ignition flame in the region just downstream of burner wall 77 where the velocities of entering air are comparatively low. Fuel tubes 91, on the other hand, supply the fuel for the principal combustion occurring in chamber 75, the fuel being intimately mixed with incoming ram air by the high degree of turbulence created by the passage of ram air through scoops 88 and holes 87 and the consequent irregular air flow within chamber 75.

The ignition system of the present invention is not shown in any great detail inasmuch as the particular form of the ignition system used is not important to the present invention, it being sufficient that a system be used which is adapted for creating a spark or other ignition means in the forward or pilot flame region of combustion chamber 75. Thus, for example, a spark or glow plug 94 may be threadably secured in igniter fitting 52, as best illustrated in Figure 5, plug 94 projecting into the forward portion of combustion chamber 75 to thereby provide means for igniting the pilot flame and maintaining steady burning. The energy source (not shown) for actuating spark plug 94 may be located in fuselage 12 and comprised of batteries, ignition coils, and condensers to thereby effect a capacitive discharge type of ignition characterized by a high intensity spark.

The inboard section, designated generally by the numeral 95, adjacent fuselage 12 differs from the typical bay of wing panel 15 mainly in that a burner can section 74 is omitted therefrom to allow a comparatively free flow of air therethrough. Thus, as best illustrated in Figures 5 and 6, the inboard tip of diffuser 28 is made concave, in elevational cross section, in order to fit against fuselage 12, and wing surface panels 17 and nozzle section 29 are extended to form a part of the inboard section. The omission of a can section therefrom is for the reason that control is thereby had of low energy boundary layer air flowing about fuselage 12, and also to obtain a cooling of the area adjacent fuselage 12.

The outboard tip section formed by wing tip 18 serves to reduce drag and is generally comprised on continuations of the components of wing panel 15, the configuration of the wing tip section components mainly differing to the extent of their semi-circular shape and the three-dimensional flow thus occurring about their surfaces. As respects wing tip section 18, a can section modified to be accommodated within the configuration of wing tip section 18 may be fitted therein if desired. Details of construction of such modified can section are not here shown since it is not essential to the present invention. Inasmuch as the primary function of wing tip 18 is to reduce drag it is essentially a fairing, but may contain a can section for developing thrust if it is desired that the wing tip 18 should also serve to assist in the propulsion of aircraft 11. The components of wing tip 18 may be secured in position to its wing panel section 15 by any suitable means such as, for example, welding, or by machine screws or the like if a removable attachment is desired.

A pair of control surfaces or flippers 96 may be attached to wing tips 18, respectively, and secured thereto in any suitable manner and operatively coupled to usual and conventional control means or apparatus located in fuselage 12. Control surfaces 96 serve as lateral control for aircraft 11 and are not shown in detail for the reason that they do not form an essential part of the present invention, being only suggestive of a conventional control means.

A suitable corrosion and temperature resistant metal is employed in the present invention. A preferred metal is 17-7PH stainless steel which is commercially available from the American Rolling Mills Corporation. Welding of this material may be by either of both the electric resistance welding method or metal arc welding method, with or without filler rod but preferably inert gas shielded. It is important, however, that with any materials and attachment methods used that the resulting structure be adapted to withstand the fairly high temperatures generated in the use of the apparatus of the present invention. It is specifically understood that the particular material and fastening methods mentioned are merely preferred and that the use of suitable substitutes are contemplated. Any material employed desirably should exhibit, in addition to good high temperature characteristics, a high Young's modulus of elasticity, at elevated temperature, for stiffness; reasonable elongation for formability; a low coefficient of thermal expansion and ease of welding.

The present invention is designed to function with optimum results at high altitudes of between approximately 30,000 to 100,000 feet, and at a flight Mach number of approximately 3.0. It is particularly to be noted however that these are merely desirable limits of operation, and that no limitation of the application of the present invention is intended.

The operation and purpose of wing panel 15 in conjunction with aircraft 11 has been generally described hereinabove, but it is believed desirable to summarize the operation or typical functioning of an aircraft 11 when equipped with the unique wing 14 of the present invention. Thus, aircraft 11 is first brought by air or ground launching, as desired, to a speed suitable for the self-propelled operation of the ramjet type of jet propulsion, this launching generally being accomplished through the use of expendable rocket type boosters, as is well known in the art. In this connection it is to be noted that the present invention possesses advantages over known missiles or aircraft of the art in that the present aircraft or missile 11 can itself assist in the attainment of design speeds. That is, as the booster means starts missile 11, the ramjet of wing 14 may be utilized almost immediately, assuming the existence of self-supporting combustion, in order to thereby assist in boosting missile 11 at lower, off-design speeds and altitudes and until design speed and altitude is reached. Thus, the size and weight of any booster required for initial propulsion may be reduced without too great a corresponding reduction in the fuel available to missile 11 once design speed and altitude have been attained. Further, in addition to the aerodynamic lift for missile 11 which is achieved by virtue of external airflow over external surfaces of wing 14, there is additional lift derived from the internal flow of air through wing 14.

As is well known, self-supporting combustion in ramjet engine propulsion means, such as is embodied in missile 11, does not occur until the speed of the ramjet relative to the outside airstream is sufficient that the ram effect of air entering the ramjet effects a compression ratio great enough to support combustion. Thus, in the present invention the velocity energy of the high velocity airstream entering wing 14 is converted by diffuser 28, in combination with diffuser lips 19, to a much lower velocity airstream of higher pressure energy at the upstream end of can 26. This local slowing down of the airstream produces a condition desirable for effecting a steady ignition zone within can 26.

Fuel is then supplied through pilot fuel tubes 92 to fuel nozzles 93 and is finely dispersed or sprayed within the upstream end of can 26 where it is ignited by glow plugs 94, creating a steady ignition zone which serves as a pilot zone or flame for the main combustion occurring within combustion chamber 75. The comparatively sheltered location of this pilot flame behind or downstream from the forward wall 77 of can 26 permits a desired steady and continuous burning thereof for ignition of the main fuel air mixture.

Fuel from main fuel line 64 is carried by the plurality of fuel tubes 91 to a position slightly upstream of scoops 88 of can 26, as illustrated. Upon leaving tubes 91, this fuel is finely disbursed by the turbulence of the airstream as it enters scoops 88 and, subsequently, holes 87, and the resulting fuel-air mixture in combustion chamber 75 of can 26 is ignited by the pilot flame just described. The turbulence of the airstream at this point, created by scoops 88 and holes 87, also asists in the mixture of burning with unburned gases to hasten the combustion process in combustion chamber 75 wherein the combustion process is carried substantially to completion.

A considerable quantity of what is termed "primary" air is consumed in the ramjet combustion process, but a great deal of the entering airstream is not so consumed, but instead is used as "secondary" air for cooling purposes. In this connection, secondary air entering holes 87, and particularly entering louvers 89 positioned on can 26 where temperatures are fairly high, provides a blanket or boundary layer of air which sweeps over the inner surfaces of can 26 for cooling thereof. Another well known effect of this boundary layer of cooling air is the scrubbing from these inner walls of soot or carbonaceous deposits which may be formed by the impingement of fuel against the hot structure defining chamber 75. In addition, this secondary air flows in the ducts adjacent wing surface panels 17, and further, is mixed with, or dilutes, the hot gases in chamber 75 whereby an aceptable temperature distribution is provided throughout the structure of wing 14.

There has been described hereinabove a structure approximaitng the ideal, low drag split plate structure and which forms both sustaining and propulsion means for an aircraft vehicle, and which is characterized by high aerodynamic and thermodynamic efficiency in the utilization of components adapted for substantially two-dimensional airstream flow.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What I claim is:
1. In an airborne vehicle, aerodynamic sustaining and propulsion means operatively associated with said vehicle, said means comprising a pair of spanwise extend- ing panel members arranged in spaced superposed relationship, a spanwise extending air diffusing body located between and spaced from said pair of panel members at the forward edges thereof, said air diffusing body having a forwardly extending wedge portion whereby it is adapted to effect two dimensional supersonic external compression of the air flow, a spanwise extending combustion chamber located between said pair of panel members, said combustion chamber having apertured walls forming a faired rearward continuation of said air diffusing body and diverging rearwardly to form converging air passages with said pair of panel members, and nozzle means located between said pair of panel members and forming a rearward continuation of the walls of said combustion chamber.

2. In an airborne vehicle, propulsion means forming a wing of said vehicle and comprising a pair of spanwise extending panel members arranged in spaced superposed relationship, each of said panel members comprising a forward spar, a rearward spar, a pair of metallic sheets connected between said forward spar and said rearward spar, and a plurality of transverse sandwich elements connected between said pair of sheets in a spanwise direction to thereby rigidify said panel member, a spanwise extending air diffusing body located between and spaced from said pair of panel members at the forward edges thereof, a spanwise extending combustion chamber located between said pair of panel members, said combustion chamber having apertured walls forming a faired rearward continuation of said air diffusing body and diverging rearwardly to form converging air passages with said pair of panel members, and nozzle means located between said pair of panel members and forming a rearward continuation of the walls of said combustion chamber.

3. In an airborne vehicle, propulsion means forming a wing of said vehicle and operatively associated with said vehicle, said means comprising a pair of spanwise extending panel members arranged in spaced superposed relationship, a spanwise extending air diffusing body located between and spaced from said pair of panel members at the forward edges thereof, said air diffusing body embodying a hollow portion and having a forwardly extending wedge portion whereby it is adapted to effect two dimensional supersonic external compression of the air flow, a spanwise extending combustion chamber located between said pair of panel members, said combustion chamber having apertured walls forming a faired rearward continuation of said air diffusing body and diverging rearwardly to form converging air passages with said pair of panel members, ignition and fuel distribution means disposed within said hollow portion of said air diffusing body, and nozzle means located between said pair of panel members and forming a rearward continuation of the walls of said combustion chamber.

References Cited in the file of this patent

UNITED STATES PATENTS

| | | |
|---|---|---|
| 1,725,914 | Hallowell | Aug. 27, 1929 |
| 2,486,967 | Morrisson | Nov. 1, 1949 |
| 2,510,645 | McMahan | June 6, 1950 |
| 2,595,999 | Way et al. | May 6, 1952 |
| 2,597,610 | Berliner | May 20, 1952 |
| 2,631,425 | Nordfors | Mar. 17, 1953 |
| 2,670,601 | Williams et al. | Mar. 2, 1954 |
| 2,672,333 | Rocheville | Mar. 16, 1954 |
| 2,735,263 | Charshafian | Feb. 21, 1956 |